June 6, 1961    G. C. HUGHES    2,987,073
FLUID PRESSURE RELIEF VALVE
Filed March 26, 1959
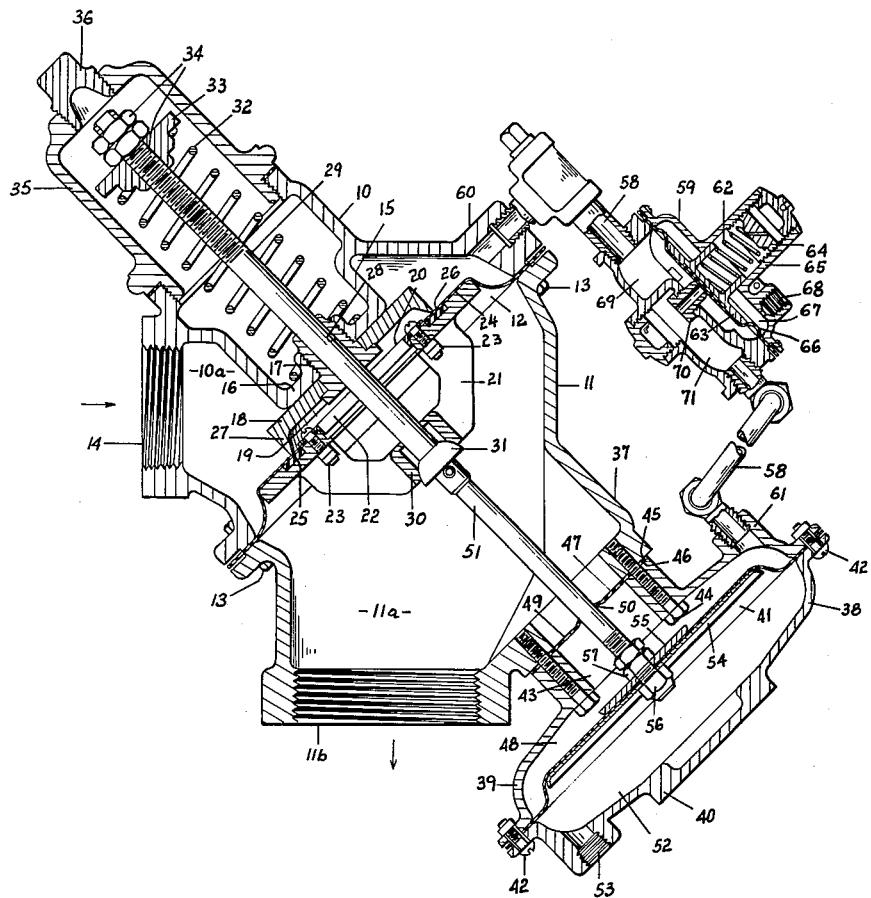
INVENTOR.
GEORGE C. HUGHES
BY
Teare, Kramer, Sturges & Fetzer
ATTORNEYS

United States Patent Office 2,987,073
Patented June 6, 1961

2,987,073
FLUID PRESSURE RELIEF VALVE
George C. Hughes, Anderson, Ind., assignor to Reynolds Gas Regulator Company, Anderson, Ind., a corporation of Indiana
Filed Mar. 26, 1959, Ser. No. 802,046
6 Claims. (Cl. 137—489.5)

This invention is concerned with improvements in or relating to fluid pressure relief valves and particularly to relief valves for use in the distribution of gaseous materials, e.g. natural gas.

The invention provides a relief valve including a housing which is divided into two chambers by a flexible diaphragm. One of the chambers is connected by a suitable conduit to a source of fluid under pressure which is to be maintained at or below a predetermined maximum. The other chamber may be vented to the atmosphere or fitted with a suitable conduit for conducting the gases or fluid under pressure to a point of utilization. The diaphragm is provided with an opening which extends therethrough and is biased against a fixed closure member by a counter weight or spring associated with the supporting member carried by the diaphragm. An increase of pressure in the supply to a predetermined level increases the pressure in the pressure chamber and moves the diaphragm away from its closure against the action of the biasing counterweight or spring, thereby permitting the escape of such pressure through the diaphragm opening into the vent chamber and out of the valve through the vent.

There is additionally provided an auxiliary diaphragm dividing an auxiliary housing into two chambers, a high pressure chamber and a low pressure chamber, the terms "high" and "low" being used in a relative sense to denote a difference in pressure within the two chambers of the auxiliary housing when the device is operative. The high pressure chamber of the auxiliary housing is connected by a suitable conduit with that side of the main relief valve diaphragm exposed to the source of fluid pressure. This conduit is provided with pressure regulating means, for example, a diaphragm valve. The high pressure side of this auxiliary diaphragm is also connected through a small orifice to the vent side of the main diaphragm. The biasing means on the main diaphragm is integrally connected with the auxiliary diaphragm such that when the auxiliary diaphragm is moved by application of pressure to the high pressure side thereof, this movement is transmitted to the biasing means and coacts therewith to aid in overcoming the bias and permits further opening of the main diaphragm. The pressure regulator in the line from the inlet chamber to the high pressure chamber may be a spring biased diaphragm valve which is adapted to control the flow of pressure fluid into the high pressure chamber of the auxiliary housing.

A feature of this invention, then, is the provision of means to give large volume relief without the necessity of imposing inlet pressures substantially in excess of the set pressure for relief. This, therefore, is a principal object of the present invention.

Other objects of the invention will appear as the description proceeds.

To the accomplishment of the foregoing and related ends, said invention then, consists of the means hereinafter fully described and particularly pointed out in the appended claims, the following description and annexed drawings setting forth in detail certain illustrative and embodiments of the invention, such disclosed means constituting, however, but a few of the various forms in which the principle of this invention may be employed.

In the annexed drawing,

The sole figure is a centrally located vertical section taken through one embodiment of the invention.

As illustrated in the drawings the improved relief valve includes an upper housing member 10 and a lower housing member 11 between which a flexible pressure responsive diaphragm 12 extends. The diaphragm 12 is clamped between matched faces of the housing members 10 and 11 as by bolts 13.

The upper housing member 10 has a threaded inlet opening 14 adapted to receive a conduit connecting it with a fluid pressure source as, for example, a gas distributing line not illustrated. The upper housing member 10 is provided with an inwardly extending boss or protuberance 15 terminating at its innermost extension in a platform 16 centrally positioned in the housing member 10. The platform 16 and the boss 15 form an integral part of the housing member 10. The platform 16 has a single threaded opening 17 therethrough. Mounted on the platform 16 is a closure plate or disc 18 secured to the platform 16 by means of nut 19 threaded into the opening 17.

The diaphragm 12 comprises a circular sheet of flexible, rubber-like material reinforced to eliminate any substantial stretching. The diaphragm is resilient only to a minor degree. Materials used in the manufacture of such diaphragms are well known in the art at the present time. Diaphragm 12 is provided with a centrally located opening 20. Support for the circumference of the opening 20 in the diaphragm 12 is provided by a supporting spider 21 and a thin metallic annulus 22 clamping the rubber diaphragm 12 therebetween as by bolt 23. The diaphragm contacting face 24 of the spider 21 defines a ring which in the preferred embodiment may be provided with an annular groove 25 having embedded therein a resiliently flexible material 26.

The opening 20 in the diaphragm 12 is normally closed by a closure plate or disc 18 against which the diaphragm 12 is biased, as will be hereinafter more fully described. This disc 18 is larger in diameter than the opening 20. Adjacent its edges, the disc 18 is provided with an upstanding annular rib 27 which engages the upper side of the diaphragm 12 bearing against the diaphragm 12 at a point underlaid by the resiliently flexible embedded ring 26.

The disc 18 is, as indicated above, secured to the platform 16 by a threaded nut 19 having a cylindrical bore 28 axially therethrough.

As indicated above, the diaphragm 12 is biased against the closure plate or disc 18. The biasing means includes a stem 29 slideably fitted in the nut 19 and extending through the opening 20 in the diaphragm 12, and through a loosely encircling portion 30 of the spider 21 opposite the opening 20 in axial alignment therewith. The portion of the stem 29 extending through the loosely encircling member 30 is provided with a bumper 31 releasably engaging the loosely encircling portion 30 of the spider 21.

The closing bias is provided by spring means such as coil spring 32 operating between the outside of the platform 16 and an adjustable abutment or shoulder 33 threadedly or slideably engaging the outermost portion of the stem 29, being held in predetermined adjustment by means of lock nuts 34. An outwardly extending hollow cylinder boss 35 secured to the upper housing member 10 is provided to protect the biasing mechanism. This arrangement permits adjustment of the pressure the spring 32 exerts against the diaphragm 12 to bais the latter to a closed position. Access to the adjusting nut 34 is had by removal of a threaded plug 36 which forms a closure for the cylinder boss 35.

The lower housing member 11 is provided with a boss 37 in axial alignment with the shaft 29. Attached to the boss 37 is an auxiliary housing 38 including an upper auxiliary housing member 39 and a lower auxiliary housing member 40 between which a flexible pressure responsive diaphragm 41 extends. The auxiliary housing members 39 and 40 comprise substantially hollow bell-shaped members, the lower member 40 being inverted, and the diaphragm 41 being clamped between the larger ends of both members as by bolts 42. The upper auxiliary housing member 39 is provided with a centrally located opening 43 therein coextensive in size with a corresponding opening in the boss 37 of the lower housing member 11. Means, such as bolt means 44, are provided for securing the upper auxiliary housing 39 to the boss 37. The machined surfaces 45 and 46 of the boss 37 and the upper auxiliary housing 39 provide a clamping surface of a resiliently flexible sealing member or disc 47 isolating the vent chamber 11a from the high pressure chamber 48 defined by the auxiliary housing member 39 and the diaphragm 41. A small opening or orifice 49 through the flexible plate 47 is provided as well as an opening 50 through which the shaft extension 51 passes in a fluid tight manner. The low pressure chamber 52 defined by the lower auxiliary housing member 40 and the diaphragm 41 is vented to the atmosphere through vent 53.

The diaphragm 41 is a circular sheet of flexible rubber-like material reinforced to eliminate any substantial stretching. Diaphragm 41 is resilient only to a minor degree. Materials used in the manufacture of such diaphragm are well known in the art at the present time. The diaphragm 41 is clamped between a pair of thin metallic reinforcing plates 54 and 55 by nuts 56 and 57 secured by matching threads to the extension 51 of the stem 29.

As shown in FIG. 1, the first pressure chamber 10a is connected by means of a conduit or by-pass 58 to the high pressure chamber 48 in the auxiliary housing 38. A diaphragm valve 59, or other suitable pressure regulating valve 59 is provided in the conduit 58 to control the flow of fluid therethrough. As illustrated in the embodiment of FIG. 1, the upper housing 10 is provided with a boss 60 bored and threaded to receive the conduit 58. Likewise, the upper auxiliary housing member 39 of the auxiliary housing 38 is provided with a bored and threaded boss 61 to receive the conduit 58. A pressure regulating device 59 may, as indicated above, be of the diaphragm valve type having an adjustable biasing means such as biasing spring 62 compressed between diaphragm supporting plate 63 and an adjustable threaded abutment 64 within the housing 65. A flexible diaphragm of similar material to the other diaphragm 66 divides the housing 65 into an outer chamber 67 which is vented as at 68 to the atmosphere, and a second pressure chamber 69. The diaphragm 66 is normally seated against a valve seat member 70 communicating with the chamber 69 and leading to outlet chamber 71 to which the continuation of the conduit 58 is suitably attached. The diaphragm is biased against the closure or valve seat 70 by the spring 62.

In operation, the main biasing spring 32 retains the diaphragm 12 seated against the closure disc 18 and the upstanding annular rib 27 as long as the pressure in the source and hence in the chamber 10a remains below a predetermined maximum for which the diaphragm biasing spring 32 was set. Should, however, the pressure in the chamber 10a exceed such maximum, the resulting increase in such pressure against the diaphragm will move it against the biasing action of the spring and away from the closure disc 18. Accordingly, gas will flow from the source through the opening 20 in the diaphragm assembly 12, 21 and 22, the chamber 11a on the vent side of the diaphragm 12, and will pass out of the valve housing through the outlet 11b. When the pressure in the supply drops below the maximum, the spring 32 will cause the diaphragm 12 to engage the upstanding annular rib 27 of the closure plate 18 and thereby stop the flow of gas from the pressure source through the relief valve.

Simultaneously, fluid under pressure flows through the bore in the boss 60 of the upper housing 10 through the pressure regulator 65 which has been set to open at the same pressure as the main biasing spring 32 such as, by adjustment of the abutment 64 against the spring 62. The fluid pressure of the source is thus transmitted to the high pressure side of the auxiliary diaphragm 41 which coacts through the diaphragm assembly 41, 54, 55 and the stem extension 51 to further aid in overcoming the bias of the spring 32 thus causing the diaphragm 12 to open more widely than would be the case in the absence of the auxiliary diaphragm under the same conditions. Retention of the pressure in the upper auxiliary chamber 48 is secured by the closure plate or disc 47 having only a small aperture or orifice 49 therein for continuous bleeding of the fluid back into the chamber 11a.

In general, diaphragm 41 may be regarded as having 0—0 pressure on its surface when closed, and spring 32 has sufficient bias to seal diaphragm 12 only. Therefore, when the pressure regulating valve 59 operates and diaphragm 66 opens, the full pressure of the source is applied to diaphragm 41 which results in more opening of diaphragm 12. The additional power applied by diaphragm 41 gives more travel in an opening direction per unit pressure increase above set point to diaphragm number 12 than is available with diaphragm 12 only, hence there is more capacity in the unit. Assuming an example, in a device having a two inch diameter inlet 14 and a three inch diameter outlet 11b, biasing springs 32 and 62 were set to relieve at 12 inches water column. The pressure in the inlet increased to 18 inches W.C. Under these conditions, the capacity of the relief valve of FIG. 1 is approximately 19,000 cu. ft. of gas per hour. Without the auxiliary diaphragm 41 and with conduit 58 closed and inoperative, the capacity of the device of FIG. 1 is less than 1,000 cubic feet at 18 inches W.C.

A device constructed substantially in accordance with FIG. 1 having the auxiliary diaphragm 41, but in which the conduit 58 is closed off, the pressure required to give a capacity deliverance of 18,000 cubic feet per hour is approximately 1.3 p.s.i. Without the by-pass line 58 and with the auxiliary diaphragm 41 inoperative as by disconnecting the extension 51 from the stem 29, the pressure required to give a flow rate of 18,000 cubic feet per hour is approximately 3.5 p.s.i. From this example it can be seen that the by-pass line 58 and its pressure regulating device together with the auxiliary diaphragm 41 in a relief valve is required to give large volume release without the necessity for pressures substantially in excess of the "set point" of the biasing spring 32.

There is a safety feature in the device of the present invention in that should the by-pass pressure relief valve fail to operate, the device will still operate to give large volume relief at a slightly higher pressure. The orifice 49 in the sealing member 47 is a small bleed hole which allows gas from the high pressure chamber 48 to pass into the outlet 11b of the main relief valve. If the pressure regulating valve 59 fails to open, and after the main relief valve or diaphragm 12 has opened against the bias of spring 32 the back pressure created in the chamber 11a of the main relief valve is applied through the orifice 49 in the diaphragm 47 to impose increased pressure on diaphragm 41 and thus aid in the further opening of diaphragm 12 thereby increasing the capacity of the relief valve. The advantage is that the valve operates even if the by-pass valve fails. The valve can also operate if the auxiliary diaphragm structure fails, but the pressure is higher than either normal operating pressure, or the pressure required for relief in the event of failure of the by-pass valve, assuming equivalent capacity.

Other modes of applying the principle of this invention may be employed instead of those specifically set forth above, changes being made as regards the details herein disclosed, provided the elements set forth in any of the following claims, or the equivalent of such be employed.

It is therefore, particularly pointed out and distinctly claimed as the invention:

1. In a fluid pressure regulating valve including a housing, a first flexible diaphragm dividing the housing into a first pressure chamber and a vent chamber, said first pressure chamber having an inlet opening adapted to be connected to a source of fluid under pressure which is to be maintained below a predetermined maximum, said vent chamber having an outlet opening, said first diaphragm having an opening extending therethrough, closure means for said first diaphragm opening positioned within said housing, and biasing means acting on said first diaphragm to oppose the pressure in said pressure chamber and move said first diaphragm toward closing position relative to said closure means, said biasing means including a shaft extending in movable relation through said closure means and said first diaphragm opening, spring means operative between said shaft and said housing to urge said shaft in one lengthwise direction, said shaft including means for transmitting the biasing force of said spring means to said first diaphragm, an auxiliary diaphragm in an auxiliary housing and dividing said auxiliary housing into a high pressure chamber and a low pressure chamber, said last mentioned high pressure chamber communicating with said vent chamber through an orifice, means coacting between said shaft and said auxiliary diaphragm to aid in moving said first diaphragm away from said closure means and thus opposing the biasing force of said biasing means upon the application of fluid under pressure to said last mentioned high pressure chamber, and by-pass means including a pressure regulator for conducting fluid under pressure from said first pressure chamber to said high pressure chamber in said auxiliary housing.

2. In a fluid pressure regulating valve including a housing, a first flexible diaphragm dividing the housing into a pressure chamber and a vent chamber, said housing having an inlet port communicating with said pressure chamber, said inlet port being adapted to be connected to a source of fluid under pressure which is to be maintained below a predetermined maximum, said housing having an outlet port communicating with said vent chamber, said diaphragm having an opening extending therethrough, closure means for said diaphragm opening positioned within said housing, biasing means acting on said diaphragm to oppose the pressure in said pressure chamber and move said diaphragm toward closing position relative to said closure means, said biasing means including a shaft extending in movable relation through said closure means and said diaphragm opening, an abutment adjustably secured to one end of said shaft, spring means operative between said abutment and said housing, and means coacting with said shaft for transmitting the biasing force of said spring means to said diaphragm, an auxiliary housing having an auxiliary diaphragm therein dividing said auxiliary housing into a high pressure chamber and a low pressure chamber, by-pass means including a pressure regulator for conducting fluid under pressure from said first mentioned pressure chamber to said high pressure chamber in said auxiliary housing, means providing restricted communication between said last mentioned pressure chamber and said vent chamber, and means coacting between said biasing means and said auxiliary diaphragm to aid in moving said first diaphragm away from said closure means and thus opposing the biasing force of said biasing means upon application of fluid under pressure to said high pressure chamber in said auxiliary housing.

3. A fluid pressure regulating valve in accordance with claim 2 in which the means for transmitting the bias of the spring means to the first diaphragm includes a spider bridging the opening in said diaphragm and having a portion thereof encircling said shaft, and a bumper on said shaft releasably engaging the portion of said spider encircling said shaft in a valve closing direction.

4. A fluid pressure regulating valve in accordance with claim 2 in which the means coacting between said biasing means and said auxiliary diaphragm is an extension of said shaft attached to said auxiliary diaphragm.

5. In a fluid pressure regulating valve including a housing, a first flexible diaphragm dividing the housing into a first pressure chamber and a vent chamber, said first pressure chamber having an inlet opening adapted to be connected to a source of fluid under pressure which is to be maintained below a predetermined maximum, said vent chamber having an outlet opening, said first diaphragm having an opening extending therethrough, closure means for said first diaphragm opening positioned within said housing, and biasing means acting on said first diaphragm to oppose the pressure in said pressure chamber and move said first diaphragm toward closing position relative to said closure means, said biasing means including a shaft extending through the opening in said first diaphragm, an abutment adjustably secured to one end of said shaft, spring means operative between said abutment and said housing, and means coacting with said shaft for transmitting the bias of said spring means to said first diaphragm, said last mentioned means including a spider bridging the opening in said diaphragm, a portion of said spider loosely encircling said shaft, a bumper on said shaft releasably engaging the portion of said spider encircling said shaft in a valve closing direction only, an auxiliary diaphragm in an auxiliary housing, said auxiliary diaphragm dividing said auxiliary housing into a high pressure chamber and a low pressure chamber, means coacting between said biasing means and said auxiliary diaphragm to aid in moving said first diaphragm away from said closure means and thus opposing the biasing force of said spring means upon the application of fluid under pressure to said last mentioned high pressure chamber, said last mentioned means, including an extension of said shaft directly attached to said auxiliary diaphragm, means providing restricted communication between said vent chamber and said high pressure chamber in said auxiliary housing, and by-pass means including a spring biased diaphragm valve for conducting fluid under pressure from said first pressure chamber to said high pressure chamber in said auxiliary housing.

6. In a fluid pressure regulating valve including a housing, a first flexible diaphragm dividing the housing into a first pressure chamber, and a vent chamber said first pressure chamber having an inlet opening adapted to be connected to a source of fluid under pressure which is to be maintained below a predetermined maximum, said vent chamber having an outlet opening, said first diaphragm having an opening extending therethrough, closure means for said first diaphragm opening positioned within said housing, and biasing means acting on said first diaphragm to oppose the pressure in said pressure chamber and move said first diaphragm toward closing position relative to said closure means, said biasing means including a shaft extending through the opening in said first diaphragm, an abutment adjustably secured to one end of said shaft, spring means operative between said abutment and said housing, and means coacting with said shaft for transmitting the bias of said spring means to said first diaphragm, said last mentioned means including a spider bridging the opening in said diaphragm, a portion of said spider loosely encircling said shaft, a bumper on said shaft releasably engaging the portion of said spider encircling said shaft in a valve closing direction only, an auxiliary diaphragm in an auxiliary housing, said auxiliary diaphragm dividing said auxiliary housing into a high pressure chamber and a low pressure chamber, a second flexible diaphragm positioned between said high pressure chamber of said auxiliary housing and said vent chamber, said second flexible diaphragm having an orifice therethrough to limit the flow of fluid between said vent chamber and said high pressure chamber, said second diaphragm also having a centrally located opening slidably engaging in sealing relation an extension on said shaft, said shaft extension constituting means coacting between said biasing means on said auxiliary diaphragm to aid in moving said first diaphragm away from said closure means and thus opposing the biasing force of said biasing means upon the application of fluid under pressure to said high pressure chamber in said auxiliary housing, and by-pass means including a spring biased diaphragm valve for conducting fluid under pressure from said first pressure chamber to said high pressure chamber in said auxiliary housing.

References Cited in the file of this patent

UNITED STATES PATENTS

| | | |
|---|---|---|
| 2,080,824 | Kane | May 18, 1937 |
| 2,287,936 | Hose | June 30, 1942 |
| 2,306,903 | Ray | Dec. 29, 1942 |
| 2,396,574 | Hopkins | Mar. 12, 1946 |
| 2,487,418 | Birkemeier | Nov. 8, 1949 |
| 2,854,996 | Hughes | Oct. 7, 1958 |